United States Patent
Nassar et al.

(10) Patent No.: US 10,839,337 B2
(45) Date of Patent: Nov. 17, 2020

(54) SYSTEM AND METHOD FOR SECURE PROXIMITY-BASED SIGNATURES FOR PARCEL DELIVERY

(71) Applicant: International Business Machines Corporation, Armonk, NY (US)

(72) Inventors: Nader M. Nassar, Somers, NY (US);
Grant D. Miller, Boulder, CO (US);
Erich D. Walls, Indianapolis, IN (US);
Richard Newhook, Marlton, NJ (US);
Stephen Y. Chow, Coppell, TX (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 14/747,422

(22) Filed: Jun. 23, 2015

(65) Prior Publication Data

US 2016/0379157 A1    Dec. 29, 2016

(51) Int. Cl.
*G06Q 10/08* (2012.01)
*H04W 4/80* (2018.01)

(52) U.S. Cl.
CPC .......... *G06Q 10/083* (2013.01); *G06Q 10/08* (2013.01); *G06Q 10/0833* (2013.01); *H04W 4/80* (2018.02)

(58) Field of Classification Search
CPC .. G06Q 10/08; G06Q 10/083; G06Q 10/0833; H04W 4/80
See application file for complete search history.

(56) References Cited

U.S. PATENT DOCUMENTS 8,441,367 B1   5/2013  Lee et al.
8,620,821 B1   12/2013 Goldberg et al.
(Continued)

FOREIGN PATENT DOCUMENTS

EP    2347395 A0     7/2011
EP    2511861 A1 *  10/2012 .......... G06Q 10/083
WO    2010044837 A1  4/2010

OTHER PUBLICATIONS

Martínez, Caril, Leonardo Eras, and Federico Domínguez. "The smart doorbell: A proof-of-concept implementation of a bluetooth mesh network." 2018 IEEE Third Ecuador Technical Chapters Meeting (ETCM). IEEE, 2018.*
IBM; "A Computerized, Secure, Shared Automated Parcel Machine and Delivery System"; Nov. 1, 2000; whole document (8 pages).
IBM; "Network-enabled Secure Unsupervised Parcel Storage"; Mar. 6, 2009; whole document (2 pages).
(Continued)

*Primary Examiner* — Asfand M Sheikh
(74) *Attorney, Agent, or Firm* — Harrington & Smith

(57) ABSTRACT

An apparatus, termed a destination validation device (DVD), comprises a sensor configured to sense physical presence of a parcel and to obtain metadata from said parcel; at least one data processor connected with at least one memory storing software instructions that when executed causes the DVD to at least determine from reading the obtained metadata whether a signature is required for delivery of the parcel, and prepare a destination delivery acknowledgement indicating whether said signature is required; and a transmitter configured to communicate the prepared destination delivery acknowledgement external of the DVD. In this manner a delivery service can verify that the parcel is at the physical delivery location. Further details provide for also obtaining the (digital) signature when the metadata indicates it is required for delivery of the parcel. Other embodiments include a method and a computer program product comprised of software instructions on a computer-readable medium.

20 Claims, 5 Drawing Sheets

(56) References Cited

U.S. PATENT DOCUMENTS

| | | | | |
|---|---|---|---|---|
| 9,319,221 | B1* | 4/2016 | Awad | H04L 9/3231 |
| 2002/0103656 | A1* | 8/2002 | Bahler | G10L 17/24 |
| | | | | 706/14 |
| 2002/0113703 | A1* | 8/2002 | Moskowitz | A47G 29/141 |
| | | | | 340/568.1 |
| 2002/0138759 | A1 | 9/2002 | Dutta | |
| 2005/0132195 | A1* | 6/2005 | Dietl | G06F 21/64 |
| | | | | 713/176 |
| 2008/0147423 | A1* | 6/2008 | Braun | G06F 21/606 |
| | | | | 705/1.1 |
| 2009/0157420 | A1* | 6/2009 | Lou | B07C 3/12 |
| | | | | 705/1.1 |
| 2010/0097174 | A1* | 4/2010 | Marmigere | G06Q 20/3821 |
| | | | | 340/5.7 |
| 2010/0097222 | A1 | 4/2010 | Marmigere et al. | |
| 2010/0131769 | A1* | 5/2010 | Homma | G06Q 10/08 |
| | | | | 713/176 |
| 2012/0246077 | A1* | 9/2012 | Skaaksrud | G06Q 30/0615 |
| | | | | 705/50 |
| 2013/0151434 | A1* | 6/2013 | Chandaria | G06Q 10/08 |
| | | | | 705/333 |
| 2015/0120015 | A1* | 4/2015 | Fadell | G06Q 10/0631 |
| | | | | 700/90 |
| 2015/0120529 | A1* | 4/2015 | Faaborg | G06Q 10/083 |
| | | | | 705/39 |
| 2016/0180667 | A1* | 6/2016 | Bunker | G08B 13/19613 |
| | | | | 382/103 |

OTHER PUBLICATIONS

Aura, T.; "Cryptographically Generated Addresses (CGA)"; Network Working Group; Mar. 2005; whole document (24 pages); The Internet Society.

* cited by examiner

SYSTEM AND METHOD FOR SECURE PROXIMITY-BASED SIGNATURES FOR PARCEL DELIVERY

TECHNICAL FIELD

The exemplary embodiments of this invention relate generally to electronic verification systems, and more specifically concern delivery authentication of parcels through electronic means.

BACKGROUND

Parcel delivery is often associated with elongated delivery windows associated with the times a delivery truck is anticipated to be at a particular delivery location. Such parcels (or packages) include boxes, envelopes and any other manner of packaging that carry any of a wide variety of physical products from sender to recipient via a delivery service such as government postal services, FedEx®, UPS®, DHL® and the like. Typically a single run of a given delivery truck will have parcels for multiple locations, and so delays in delivering to one location propagate to later-visited delivery locations. Such delays may arise from traffic, or from the delivery-person's need to obtain a signature from the parcel recipient verifying delivery. In many residential-delivery instances, the parcel delivery person needs to knock on the door but it is not uncommon that the intended or authorized recipient of the parcel is temporarily away on an errand, in which case the delivery person leaves a note on the door informing the intended recipient of the next delivery attempt or that the parcel is available for pick-up at the local post office or a nearby parcel distribution warehouse. Often the tools available to track the parcel are insufficient except for very expensive delivery options. For the case the intended recipient is nearby but running a local errand, it is often not possible to alert the intended recipient when the parcel actually arrives at the delivery location. While delivery persons may sometimes have a contact phone number for the intended recipient, their incentive is generally to keep on schedule for the remaining parcels to be delivered rather than contact the recipient and await his/her return to sign for the parcel.

To the inventors' knowledge, all current options for the recipient to verify delivery of a given parcel rely on the physical presence of the recipient with the parcel and the delivery person, which most commonly occurs only at the established delivery location. There have been quite significant advances in recent years to track parcels electronically using tracking numbers, but such tracking indicates the delivery state or location of the parcel and do not alert the intended recipient. Moreover, in practice tracking numbers exhibit a noticeable latency to the point that certain key events across the delivery process are not updated in real-time.

SUMMARY

In a first aspect thereof the embodiments of this invention provide an apparatus, described herein as a destination validation device, comprising: a sensor configured to sense physical presence of a parcel and to obtain metadata from said parcel; and at least one data processor connected with at least one memory tangibly storing software instructions. In this first aspect execution of the software instructions by the at least one data processor causes the destination validation device to at least: determine from reading the obtained metadata whether a signature is required for delivery of the parcel, and prepare a destination delivery acknowledgement indicating whether said signature is required. The destination validation device further comprises a transmitter configured to communicate the prepared destination delivery acknowledgement external of the destination validation device.

In another aspect thereof the embodiments of this invention provide a method comprising:
optically or electronically sensing physical presence of a parcel and obtaining metadata from said parcel;
reading the obtained metadata and determining therefrom whether a signature is required for delivery of the parcel;
preparing a destination delivery acknowledgement indicating whether said signature is required; and
transmitting the prepared destination delivery acknowledgement.

In yet another aspect thereof the embodiments of this invention provide a computer program product comprised of software instructions on a computer-readable medium. Execution of the software instructions using a computer results in performing operations that comprise optically or electronically sensing physical presence of a parcel and obtaining metadata from said parcel; reading the obtained metadata and determining therefrom whether a signature is required for delivery of the parcel; preparing a destination delivery acknowledgement indicating whether said signature is required; and transmitting the prepared destination delivery acknowledgement.

DETAILED DESCRIPTION

Figure 1:
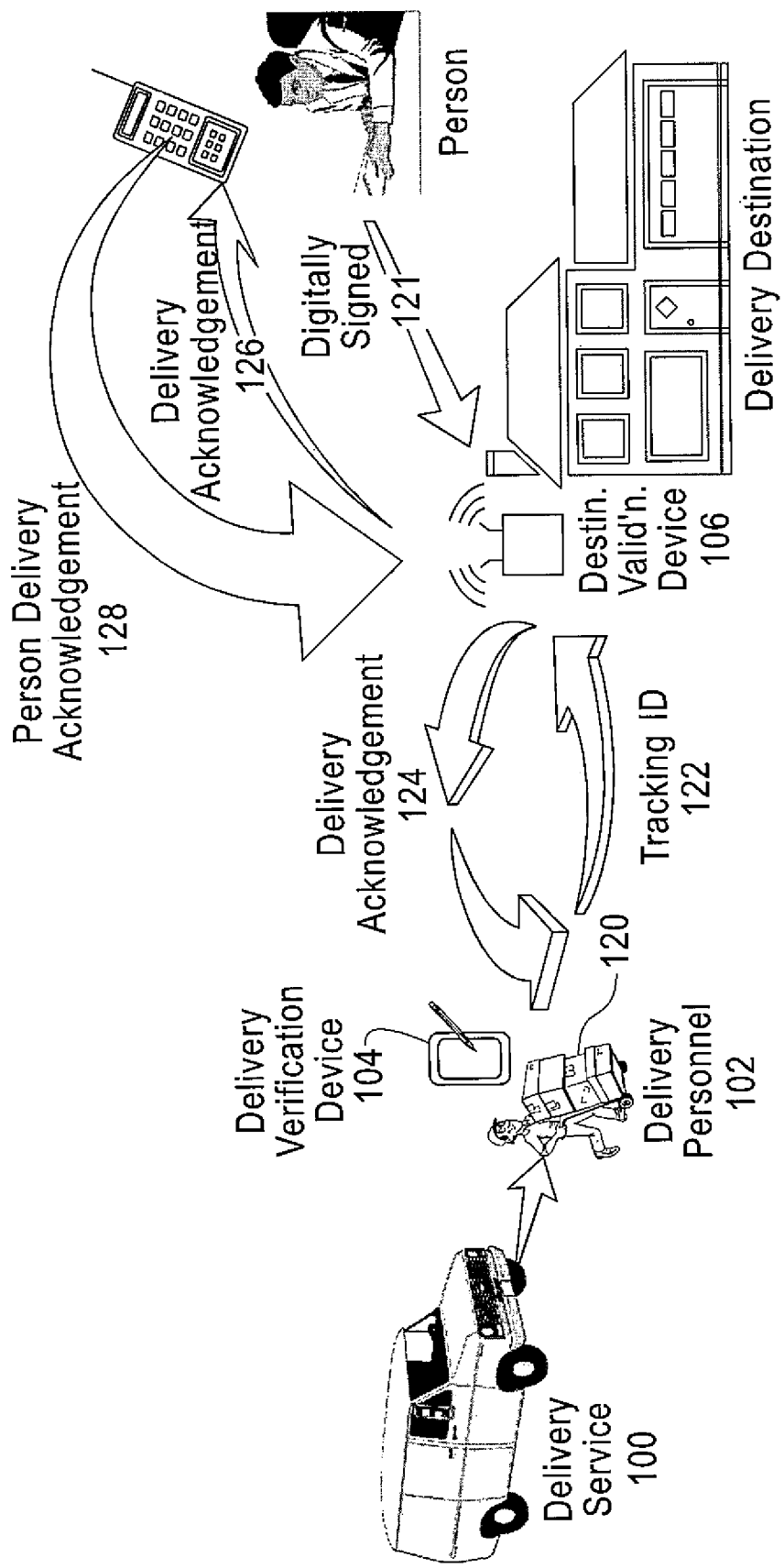
FIG. 1 is a conceptual view of a parcel delivery process according to an embodiment of these teachings.

The parcel delivery business is undergoing major changes in that drones are anticipated to replace parcel delivery persons for at least some parcel deliveries in the future. To better focus on the inventive aspects of these teachings the description below assumes a person as the entity delivering a parcel to a particular delivery location, but these teachings also encompass delivery of the parcel at the delivery location by a drone or other non-human automated parcel delivery vehicle. The description below further assumes delivery of a single package for a single individual or entity at the delivery location, but these teachings also encompass delivery of multiple such parcels; for the case two or more parcels are for the same individual or entity embodiments may generate a single personal delivery acknowledgment request for the multiple parcels or may generate a separate personal delivery acknowledgment request for each of them;

for the case two or more parcels are for different individuals or entities embodiments may simply repeat the single-parcel process described below for each of the multiple parcels.

Before detailing an example overall process according to certain embodiments of these teachings, first define a few terms for clarity.

Parcel: a package or other physical item that is to be transported from a starting location to a destination location.

Recipient: Person or entity (such as a business entity) who is authorized to take final possession of Parcel upon delivery.

Destination: Designated location (geophysical or address) where the parcel will be ultimately delivered.

Destination validation Device (DVD): Physical, electronic component able to generate a response (cryptographic in some embodiments) proving delivery of the Parcel at the Destination.

Delivery Service: Company or organization that will perform the physical routing, transport and delivery of the Parcel.

Delivery Personnel: Agent or person or automated delivery vehicle tasked by Delivery Service to perform transport and delivery of the Parcel. For this description this refers to the final agent, person or automated vehicle that completes delivery to the recipient at the Destination.

Tracking Metadata: Details related to the tracking of the Parcel, including a package identifier (tracking ID), Destination location, Authorized Person or entity from whom a signature is required, etc.

Tracking ID: Unique identification number, bar code, or other identifying data that is the digital representation of the Parcel, which may be associated with data recording the current status of the Parcel within the overall delivery process ('at distribution warehouse', 'on truck', 'delivered', etc.).

Public/Private Key: A pair of cryptographically-generated data used for data encryption and decryption.

Validation. Confirmation; for example the private key may be used to generate validation data while the public key is used to verify the validation data.

Destination Delivery Acknowledgment: A message or document that records the Tracking ID, Destination and timestamp of when a Parcel has reached the Destination (in come embodiments this includes a cryptographic signature to prove delivery of the parcel at the Destination).

Personal Delivery Acknowledgment: A message or document that records the Destination Delivery Acknowledgement (and in some embodiments also a timestamp) that an Authorized Person or entity has approved the delivery of the Parcel at the Destination.

As a context for the more detailed implementations to follow, first consider a summary of the overall delivery process according to a particular embodiment of these teachings. The cryptographic aspects of this embodiment are preferable for a robust and practical solution but in other embodiments some or all of the described cryptographic aspects need not be present, and/or some other technique for securing communications and ensuring non-repudiation may be employed such as for example multi-factor authentication which is widely used for financial transactions. The overall delivery process is more readily understood when broken into two distinct phases as in FIG. 2. Phase 1 is the initial setup between the delivery service and the authorized person and/or delivery destination, and once complete need not be repeated for further parcel deliveries to that same authorized user or delivery destination (as the case may be). Phase 2 follows the parcel itself while in custody of the delivery service and is additionally shown at FIG. 1.

The Phase 1 Setup can be considered as a kind of pre-registration of the authorized person with the delivery service, which enables the delivery service to practice these teachings with a high level of reliability and efficiency. In practice it may be that the setup phase occurs while the delivery service has possession of the parcel, for example when there is a Destination Validation Device already installed at the business destination but the parcel requires the signature of an authorized person who has not yet arranged a secure keypair with the delivery service. In this case the delivery service may first recognize that it has no keypair established with the authorized person designated by the parcel it recently took possession of, and then prior to delivering the parcel the delivery service attempts to conduct via electronic communications (email, a text or phone message requesting Internet logon, etc.) the relevant steps of the Phase 1 setup below that are not yet completed for this particular authorized person.

Figure 2:
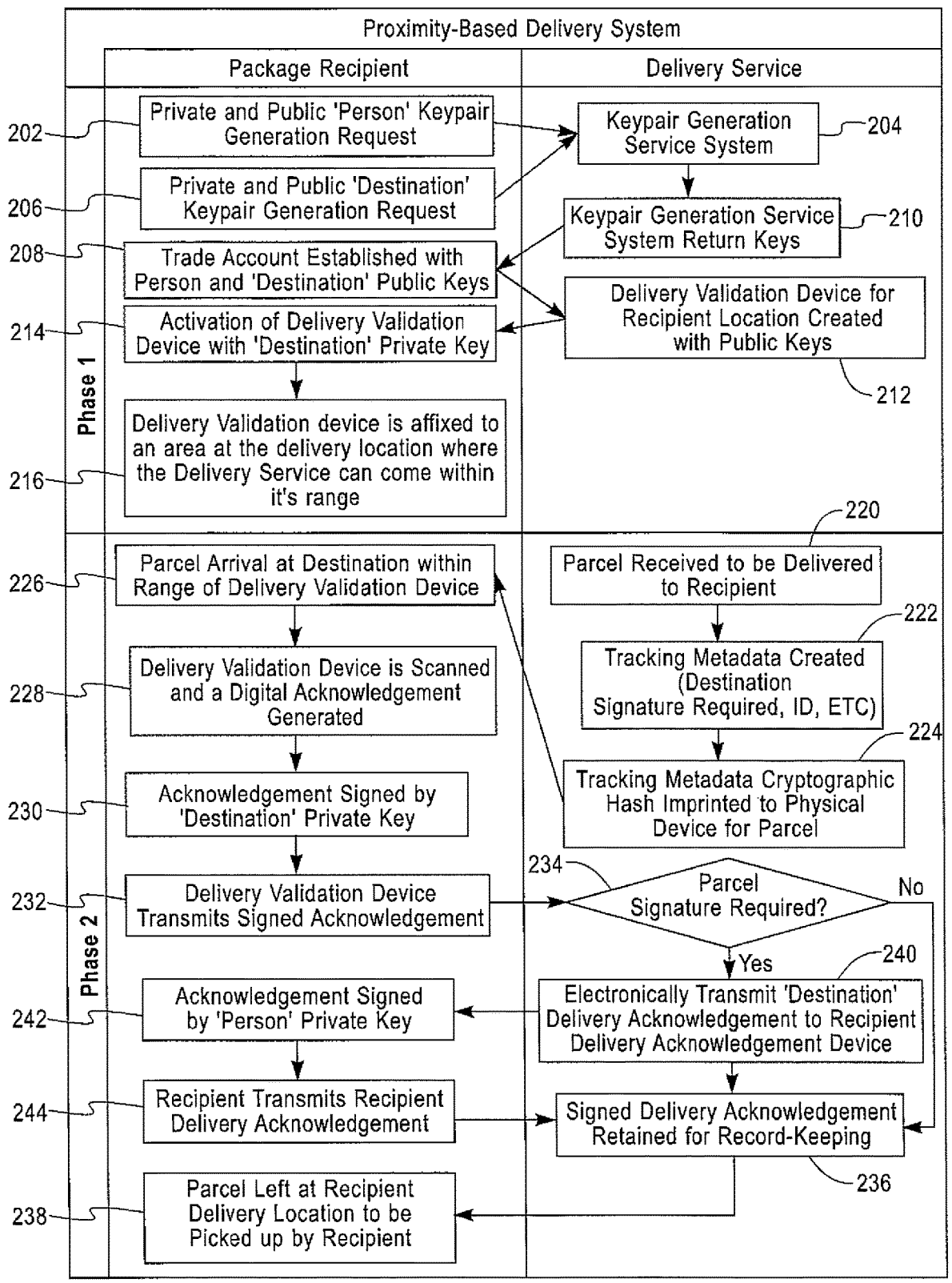
FIG. 2 is a flow diagram showing exemplary process steps for initial setup of a package delivery (Phase 2) and actual package delivery (Phase 2) according to exemplary embodiments of these teachings.

The Phase 1 setup includes but is not limited to the following steps, also shown at FIG. 2:

Person generates a 'person' cryptographic keypair which is used to digitally represent themselves. In a typical embodiment the keypair consists of both a private and a public component, but other cryptographic signatures may be used in other embodiments. In FIG. 2 the Person requests 202 this keypair generation from a service 204 provided by the delivery service.

Person generates a 'destination' cryptographic keypair used to digitally represent the physical Destination. FIG. 2 shows this as a separate request 206 to the service 204.

Person establishes a trade account 208 with the Delivery Service and the generated keypairs are provided 210 to the Person. This trade account places on record various information including but not limited to:

Destination address for Parcels.

The Person's public key, as generated above.

The Destination's public key, as generated above.

Delivery Service (optionally) sends Person a physical device 106 that will perform the physical location verification step (termed herein as a Destination Validation Device). This device is equipped 212 with the destination public keys in its memory.

Person receives the above physical device, and using the device's activation process 214 (there are many and varied device activation techniques known in the art), embeds 121 the Destination private key from step 206 into the device 106. Alternatively the Delivery Service may have its own technician personally deliver this device and upload the Destination private key from the Person's on-site computer in which it is stored.

Person (or technician) affixes 216 physical device to the Destination, in an area where Delivery Personnel may be able to physically approach it. Depending on the type of sensor this device has to sense presence of the package, it may or may not be visible to the delivery personnel who may need to only bring the parcel in close proximity to the device.

Phase 2 of the overall process is summarized below with reference to FIG. 1 and FIG. 2. In this regard there are two options for the delivery service to properly complete delivery of the parcel: if a signature or other positive acknowledgement that the package has been delivered is required from the authorized recipient (typically such a requirement would be established by the sender of the parcel) then the process below details a personal delivery acknowledgement by the intended recipient/authorized person who is designated by the sending party; if no signature is required then in the process below delivery of the parcel at the destination is proven by the delivery acknowledgement and no further signature or personal delivery acknowledgment is required. The latter may be considered as proof of delivery to the destination, while the former may be considered as proof of delivery to the authorized person as well as to the destination (since the delivery acknowledgement detailed below is generated in both options). As noted above, the sending party may require only that a signature be obtained for proper delivery of the parcel in which case the intended recipient/authorized person may be any person located at and affiliated with the business or residence destination rather than a named natural person.

Phase 2 steps:
- At step 220 of FIG. 2 the Delivery Service 100 takes possession of Parcel 120 to be delivered to Destination.
- Delivery Service 100 generates Tracking Metadata at step 222, which contains various pieces of information, including:
  Destination.
  Indicator if a Person must sign for package.
  A unique serial number, akin to a conventional tracking number.
- A cryptographic hash is generated against this Tracking Metadata at step 224 of FIG. 2, which becomes a unique Tracking ID. This Tracking ID is printed or converted into a physical device such as a radio-frequency identification (RFID) sticker, and affixed to the Parcel 120.
- Upon arrival of Delivery Personnel 102 at Destination, the Parcel 120 is brought within sensor range of the Destination Validation Device (DVD) 106 at step 226 of FIG. 2. The DVD 106 scans 122 the Tracking ID from the Parcel 120, and generates a Delivery Acknowledgement (also referred to as the Destination Delivery Acknowledgement) step 228 of FIG. 2. This Delivery Acknowledgement is then cryptographically signed at step 230 of FIG. 2 by the DVD's embedded private key that was requested at step 206 of Phase 1, to attest the authenticity of this delivery.
- The DVD transmits 124 the Destination Delivery Acknowledgement and signature to the Delivery Personnel 102 at step 232 of FIG. 2, who keeps a copy for their own records (block 236). As shown at FIG. 1, the Delivery Personnel 102 may carry a device termed herein as a delivery verification device 104 that receives this Destination Delivery Acknowledgement.
- If no Person signature is required, the delivery process is complete (block 238) as shown from steps following the 'NO' option of the decision block 234. If a Person signature is required, then Phase 2 of the overall process continues from the 'YES' option of decision block 234 as described below.
- The Delivery Service 100 transmits 126 the Delivery Acknowledgement to Person at step 240 of FIG. 2. This may be received at the Person's mobile device or any other physical device in possession of the Person, providing it contains the Person's private key from Phase 1 and can generate signatures with that stored private key.
- The Person receives the Delivery Acknowledgement. The Person then takes the Destination Delivery Acknowledgement, combines this with the current timestamp, and generates a Personal Delivery Acknowledgement document. This document is then cryptographically signed at step 242 of FIG. 2 by the Person's private key that was requested in the setup step 202, to attest the authenticity of their acknowledgement. The Personal Delivery Acknowledgement is functionally equivalent to a signature personally affixed to a paper delivery receipt in conventional parcel deliveries.
- The Person transmits 128 the Personal Delivery Acknowledgement to the Delivery Personnel 102 at step 244, who keeps a copy for their own records at block 236. Now at step 238 delivery is complete for the parcel requiring a signature for delivery.

It is anticipated that for the case a signature is required the delivery personnel 102 would wait at the destination for at least a short time to see if s/he receives the personal delivery acknowledgment to properly complete delivery of the parcel. FIG. 1 shows the destination delivery acknowledgement message being sent to the person by the DVD 106, but in other embodiments it may be the delivery verification device 104 that sends this message 126 to the person after receiving it from the DVD 106 or the delivery service 100 may use some other communication entity to communicate to the person. In either case, embodiments of these teachings encompass the person's mobile or other authorized device sending the personal delivery acknowledgment back to the delivery service 100 via the DVD 106, the delivery verification device 104, an Internet-connected server controlled by the Delivery service 100, or other such communication entities. However the delivery service 100 sends the destination delivery acknowledgement and receives in reply the personal delivery acknowledgement, the delivery service 100 can quickly communicate to the delivery personnel's handheld or vehicle-mounted device 104 (through the Internet and cellular, WiFi or other wireless system(s) for example) that the required signature/personal delivery acknowledgement has been obtained. If no such personal delivery acknowledgement is received the delivery personnel 102 would typically not leave the parcel, just as in conventional parcel deliveries when a required signature cannot be obtained.

The above Phase 2 process is designed to be dependent on prior steps being performed correctly. By the generation of tracking data, signing it, and mandatory further signings of the entire document at each major step, once a Parcel has begun the process of being delivered the associated data cannot be altered, nor can the signatures be falsely generated. It the Parcel does not complete the entire sequence as described, it will be readily apparent to all involved parties simply by inspecting the relevant Delivery Acknowledgement document.

This type of proof operates in both directions. It can be used as proof by the Person receiving the parcel that it has not arrived, but conversely the Delivery Service can make the claim with authority when a Parcel has been properly delivered. In addition, use of the Destination Validation Device 106 locks the ability to deliver the Parcel to a physical location—that is, the physical proximity of the DVD 106 itself. Protection of the physical DVD will be required in practical deployments of embodiments of the invention; however if it is stolen or otherwise relocated without authorization, the Person at the Destination where the DVD 106 is supposed to be located can simply notify the Delivery Service 100 to invalidate the associated public key, and generate a new one for a replacement DVD 106. In some deployments the Delivery service 100 will maintain ownership of the DVD 106, and in others the entity at the Destination may own it.

Figure 3:
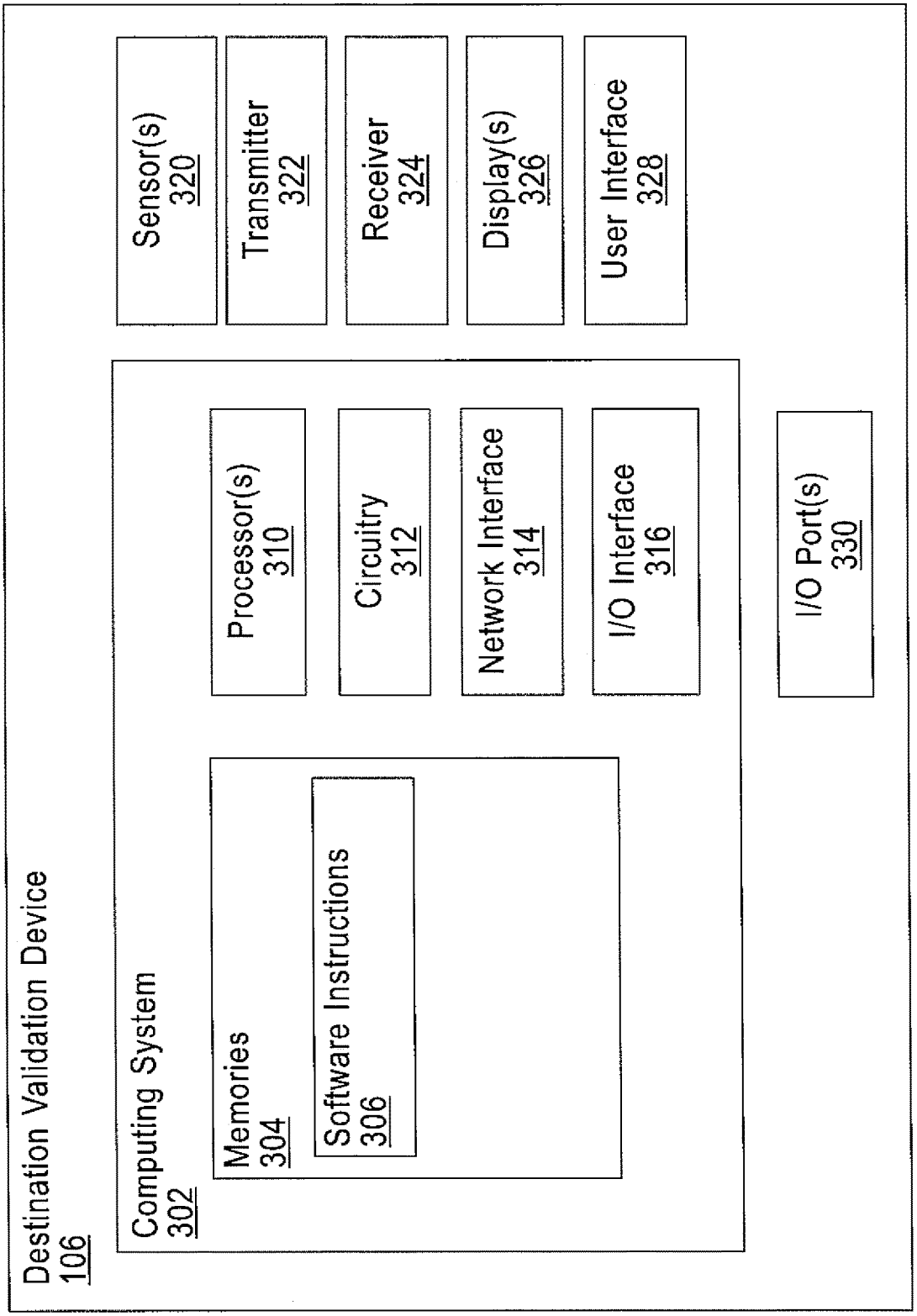
FIG. 3 is a schematic block diagram showing functional blocks of a destination validation device 106 according to certain embodiments of these teachings.
Figure 4:
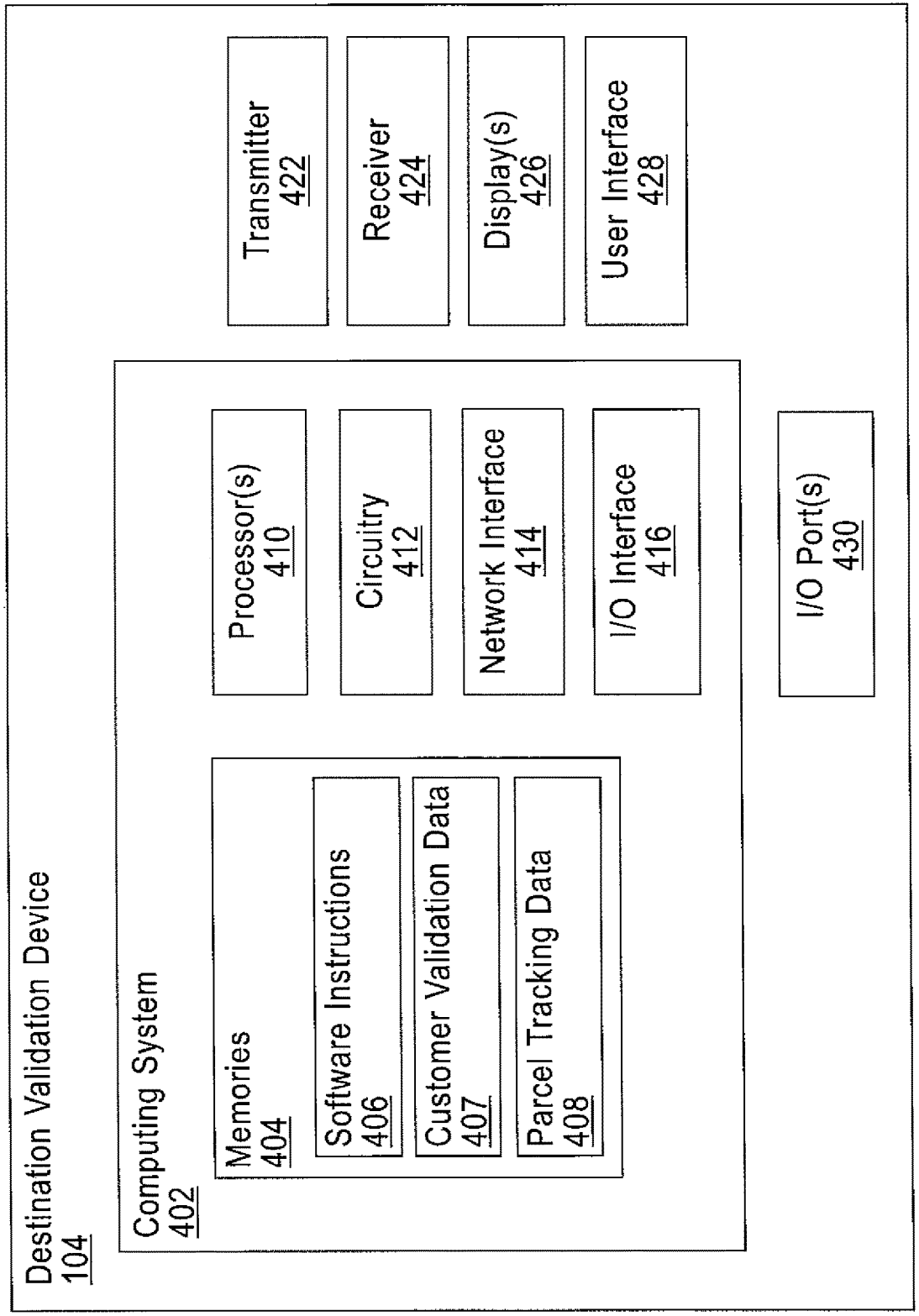
FIG. 4 is a schematic block diagram showing functional blocks of a delivery verification device 104 according to certain embodiments of these teachings.

FIG. 3 is a schematic block diagram showing an example of a destination validation device 106 according to certain embodiments of these teachings. The device 106 includes one or more sensors 320, a computing system 302, a transmitter 322 and a receiver 324, and may further include a display interface 326, a user interface 328 and one or more input/output ports 330 for connecting with external devices.

The sensor 320 is configured to sense physical presence of a parcel and to obtain metadata from said parcel. The sensor 320 may be implemented in various embodiments, such as for example an optical sensor that is configured to read a printed label affixed to the parcel to sense physical presence of that parcel, in combination with an electronic sensor that is configured to electronically obtain the metadata in response to the optical sensor sensing physical presence of the parcel. In this case the electronic sensor may be embodied as the receiver 324. In another embodiment the sensor 320 may be a radio-frequency identification (RFID) reader configured to sense presence of the parcel simultaneously with electronically obtaining the metadata, since RFID is characterized by having a very short radio range. In another embodiment the companion device/transmitter in the parcel may be quite battery-limited and so needs to be 'woken up' from a deep sleep/very low energy state by a query from some device outside the parcel, which in this case would be the DVD 106. In this embodiment the sensor 320 is configured to blindly send electronic queries, and to sense presence of the parcel by receiving a response to one or more of such queries. This only senses presence of the package though, and so further in this same embodiment the sensor 320 sends another follow-up query after sensing the as-yet unidentified parcel is present. This follow-up query is what requests the metadata from the now-awakened radio device affixed to the parcel, and the DVD 106 obtains the parcel metadata from a reply it receives to that follow-up query. These are non-limiting examples of the sensor(s) 320.

The computing system 302 includes at least one data processor 310 connected with at least one computer-readable memory 304 that stores computer readable software/program instructions 306 that are configured, when executed, to cause the DVD 106 to perform the various operations described herein such as encrypt and decrypt, read the metadata, decide whether a signature is required and generate the appropriate message based on that decision, and the like. The computing system 302 may further include a network interface 314 that is configured to compile and decompile messages using various network protocols such as Internet Protocol, any one or more of the various cellular or non-cellular (WiFi, ZigBee, Bluetooth, etc.) signaling and message organization protocols for communicating with entities outside the DVD 106 itself. Certain embodiments of the computing system 302 may include a separate Input/Output interface for enabling communications with one or both of a graphical display interface 326 and a user interface 328 which may include a pointing device and keyboard or may be incorporated with the graphical display interface 326 as a touchscreen. Any of these components which are present within the DVD 106 are connected to one another via various circuitry 312. In some embodiments the sensor(s) 320 may not be co-located with the computing system 302, for example where the sensor(s) 320 are in a less secure disposition while the remainder of the DVD 106 is located within a building and in wireless or wired communication with the remote sensor(s) 320.

Another device referred to in the above description is the delivery verification device 104, which may be implemented as a handheld or vehicle-mounted communication device used by the delivery person 102 as shown at FIG. 1. In other embodiments it may be implemented as one or more Internet-connected server controlled by the delivery service 100. The delivery verification device 104 includes a computing system 402, memories 404, software instructions 406, processor(s) 410, circuitry 412, network interface 414, I/O interface 416, transmitter 422, receiver 424, display(s) 426, user interface 428, and I/O port(s) 430 substantially as described above for the destination validation device 106 of FIG. 3. But the memories 404 may also store additional information specific to these teachings, including customer validation software as the software instructions 406, customer validation data 407 and parcel tracking data 408. The customer validation data 407 can include, for example, electronic contact information (mobile phone number, email address, etc.) for the person to whom the package is to be delivered and who is to sign for the parcel, as well as a list of verified devices he/she can use for their personal authentication/electronic signature, and the 'person' keypair (requested at step 202 of FIG. 2) which are used to encrypt and decrypt messages received at any of the verified devices on that list. The list of verified devices can be setup during the Phase 1 setup as shown in FIG. 2, and/or individual devices may be added to or dropped from the list on an ongoing basis for example if the person replaces their phone but retains the same mobile number there may be a multi-factor authentication of that new mobile phone device with the delivery service 100 once the delivery service 100 receives from that not-yet-verified mobile phone the person's personal delivery acknowledgement for a given parcel. Such multi-factor authentication can be required even for devices first added to the list upon initial setup, as a further measure to guard the delivery service 100 against repudiation by the person of a delivered parcel for which the service 100 has received a personal delivery acknowledgement. Certain software applications (apps) may also be on this verified list, for example the delivery service's security needs may be met if it receives the personal delivery acknowledgement from a mobile app that the service 100 itself provides to its customers, regardless of whether the customer's device with the app installed is itself verified and on the list.

In one embodiment the receiver 424 of the delivery verification device 104 is configured to receive the destination delivery acknowledgement from the destination validation device 106. If implemented as the delivery person's handheld or vehicle mounted device this delivery verification device 104 then can update a central tracking database of the delivery service 100. If implemented as one or more networked servers operated by the delivery service 100 then updating of the central tracking database is assumed, and the delivery service's network then updates the delivery person's handheld or vehicle mounted delivery verification device 104. For the case that no signature is required for the parcel then these updates show delivery of the parcel is complete. It is the parcel tracking data 408 which associates the individual parcel IDs or tracking numbers (or other unique identifiers) with the current delivery status, and any updates to the central tacking database for the given parcel are originated from that parcel tracking data 408 of the delivery verification device 104 which gets that status update information first from the destination delivery acknowledgement. Execution of the customer validation software 407 by the at least one data processor 410 causes the delivery verification device 104 to make its response to receipt of the destination delivery acknowledgement conditional on whether delivery of the parcel requires a signature:

for the case the destination delivery acknowledgement received from the destination validation device 106 indicates that the signature is not required, the executed customer validation software 407 causes the delivery verification device 104 to immediately update the parcel tracking data 408 to indicate the parcel has been delivered; else for the case the destination delivery acknowledgement received from the destination validation device indicates that the signature is required, the executed customer validation software causes the delivery verification device 104 to update the parcel tracking data 408 to indicate the parcel has been delivered only after receiving a personal delivery acknowledgement from a device or application that is associated in the delivery verification data 407 with an individual or an entity and also with a destination of the parcel. For example, the entity may be a business name listed in the customer validation data 407 and the destination may be the physical business address that is in the package tracking data 408, in which case during the Phase 1 initial setup the business name and address are associated with the 'person' keypair as well as the 'destination' keypair.

The destination delivery acknowledgement is originated by the destination validation device 106, but depending upon how its communications interfaces and radios are implemented the person may receive it from either the destination validation device 106 directly or from the delivery verification device 104. In various embodiments, the memory 304/404 of the destination validation device 106 or the delivery verification device 104 (as the case may be) stores one or more electronic addresses (here, electronic address includes mobile phone numbers) associated with the individual or entity that is to sign for the parcel. The transmitter 322/422 of the respective device 106/104 in this embodiment is configured to send a request for the personal delivery acknowledgement to the electronic address associated with the individual or entity, but this request is sent only for the case the destination delivery acknowledgement indicates that the signature is required. Thus the implementing software 306/406 makes a choice to send this message or not to the individual/entity based on whether the signature is required. The receiver 324/424 of the respective device 106/104 is also configured to receive the requested personal delivery acknowledgement, which is encrypted and comprises a timestamp as detailed above, which the device 106/104 then decrypts and reads, and updates the status of the signature-required parcel as having been delivered.

Figure 5:
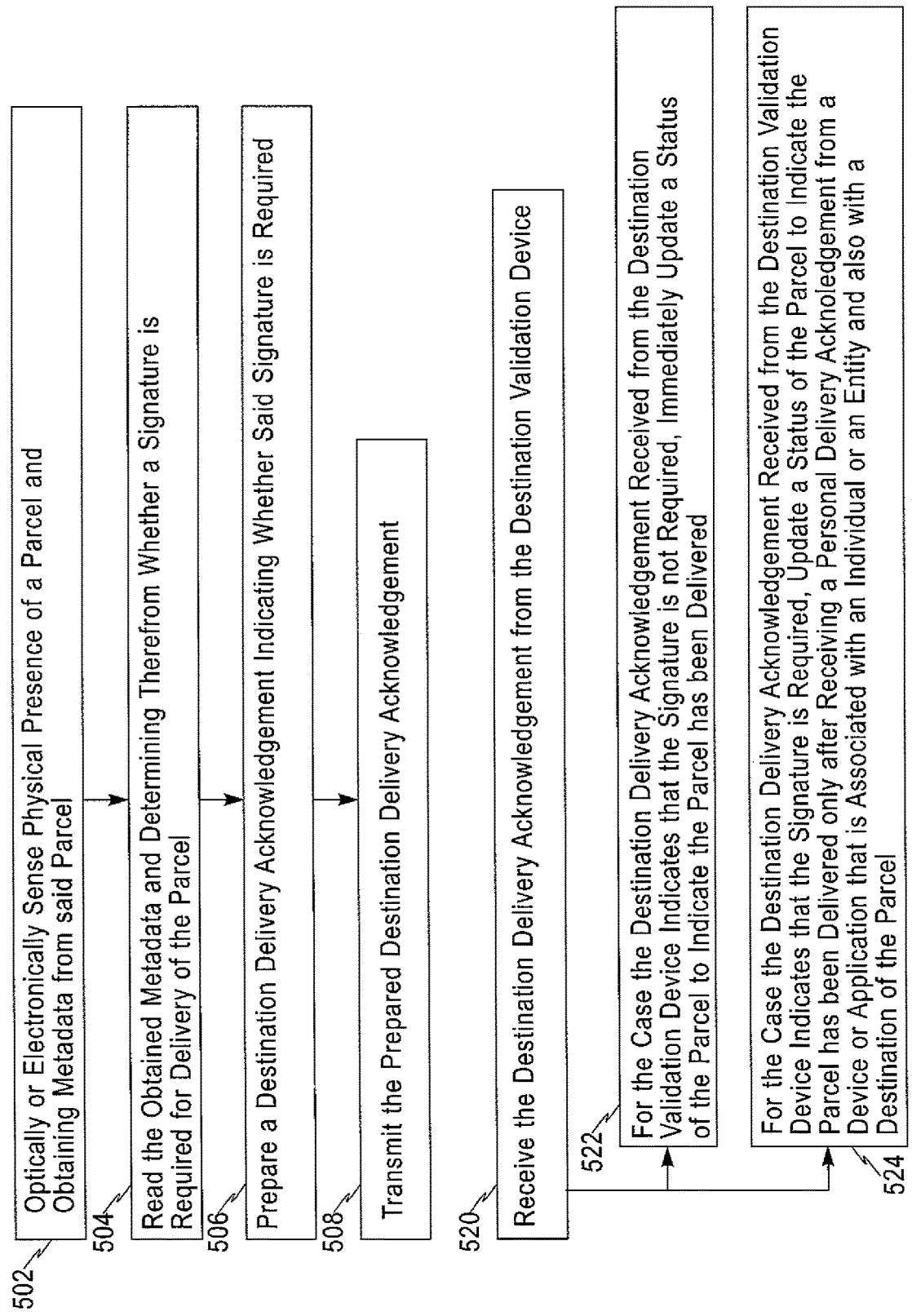
FIG. 5 is a logic flow diagram (a flow chart) that illustrates a method according to certain embodiments of these teachings.

FIG. 5 is a logic flow diagram, also referred to as a flow chart, which illustrates a method encompassing certain features of the embodiments of this invention that are detailed more fully above. Blocks 502, 504 506 and 508 recite from the perspective of the destination validation device 106, while blocks 520, 524 and 526 recite from the perspective of the delivery verification device 104 which itself may be embodied as a single device or multiple devices of the delivery services' network acting in concert with one another. At block 502 the destination validation device 106 optically or electronically senses physical presence of a parcel and obtains metadata from said parcel. Then at block 504 the destination validation device reads the obtained metadata and determines from it whether a signature is required for delivery of the parcel. In certain example embodiments above the metadata obtained by the destination validation device is encrypted and the destination validation device decrypts the metadata and reads from it a parcel identifier, a destination of the parcel, and an indication whether the signature is required. In certain embodiments the encrypted metadata is decrypted using a cryptographic authentication of a destination of the parcel. Now having validated the parcel that it sensed at block 502, the destination validation device then prepares a destination delivery acknowledgement indicating whether that signature of block 504 is required. Whether or not such a signature is required, the destination validation device at block 506 then transmits the prepared destination delivery acknowledgement. To whom that message is transmitted depends on the specific implementation; in one case if the signature is required the transmission of block 508 can go directly to the customer whose signature is required via cellular networks for example, while in another the destination validation device would send the exact same message to the delivery verification device who will prepare and transmit the message to the relevant customer. The content of that message depends on the signature requirement determined from the metadata at block 504; if a signature is required the destination delivery acknowledgement of block 508 indicates that delivery is not yet complete for lack of the signature, while if no signature is required the destination delivery acknowledgement of block 508 indicates that delivery of the parcel is in fact complete.

The remainder of FIG. 5 is from the perspective of the delivery verification device, which at block 520 receives the destination delivery acknowledgement from the destination validation device, and depending on the content of that specific acknowledgement performs either blocks 522 or 524. For the case the destination delivery acknowledgement received from the destination validation device indicates that the signature is not required, then at block 524 the delivery verification device immediately updates a status of the parcel to indicate the parcel has been delivered. Else for the case that destination delivery acknowledgement indicates that the signature is required, then the delivery verification device at block 524 updates a status of the parcel to indicate the parcel has been delivered, but it does no only after receiving a personal delivery acknowledgement from a device or application that is associated with an individual or an entity and also associated with a destination of the parcel.

In various example embodiments either (or both) of the destination validation device or the delivery verification device has stored in its local memory an electronic address associated with the individual or entity from whom the delivery service needs to obtain the personal delivery acknowledgment for this particular parcel. Only for the case as in block 524 (and not for the opposite case of block 522) that the destination delivery acknowledgement indicates that the signature is required, then the respective device 106/104 sends a request addressed to the electronic address that is associated with the individual or entity, the request being for that desired personal delivery acknowledgement. Once the requested personal delivery acknowledgement is received, in certain example embodiments the respective device 106/104 decrypts it and reads a timestamp. At this point the parcel requiring the signature may be marked in the delivery service's database as having been delivered, and the sender of the parcel can be notified that the parcel was successfully delivered.

The present invention may be a system, a method, and/or a computer program product. The computer program product may include a computer readable storage medium (or media) having computer readable program instructions thereon for causing a processor to carry out aspects of the present invention.

The computer readable storage medium (such as memory 304/404) can be a tangible device that can retain and store instructions for use by an instruction execution device (such as the data processor 310/410). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (such as the software instructions 306/406) described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As such, various modifications and adaptations may become apparent to those skilled in the relevant arts in view of the foregoing description, when read in conjunction with the accompanying drawings and the appended claims. As but some examples, the use of other similar or equivalent vulnerability types may be used by those skilled in the art. However, all such and similar modifications of the teachings of this invention will still fall within the scope of this invention.

What is claimed is:

1. A destination validation device comprising:
   a sensor installed at a destination of a recipient configured to sense physical presence of a parcel and to obtain metadata from said parcel;
   a network interface configured to compile and decompile the metadata as at least one message using a network protocol;
   at least one data processor connected with at least one memory tangibly storing software instructions, where execution of the software instructions by the at least one data processor causes the destination validation device to at least:
      determine from reading the obtained metadata whether a signature of the recipient is required for delivery of the parcel, and
      prepare a destination delivery acknowledgement comprising:
         cryptographically signing a delivery acknowledgement by the recipient with an embedded private key of the device to attest the authenticity of the delivery, wherein the destination delivery acknowledgement comprises a unique ID of the parcel; and
         indicating whether said signature is required; and
   a transmitter configured to communicate the prepared destination delivery acknowledgement as the at least one message over the network interface and external of the destination validation device, wherein:
      in response to the signature not being required, the cryptographically signing of the prepared destination delivery acknowledgement indicates delivery is complete, and
      in response to the signature being required, the prepared destination delivery acknowledgement indicates delivery is contingent on receipt of a personal delivery acknowledgement from the recipient in reply to the destination delivery acknowledgement,
   wherein the personal delivery acknowledgement fulfills the signature requirement via a digital signature comprising a private key of the recipient, the private key of the recipient being in physical possession of the recipient and configured to generate the digital signature;
   wherein the sensor is configured to blindly send electronic queries, to sense presence of the parcel by receiving a response to one or more of said queries, and to obtain the metadata via a reply to a follow-up query requesting the metadata which the sensor sends after receiving the response.

2. The destination validation device according to claim 1, wherein the sensor further comprises at least one of:
   an optical sensor configured to read a label affixed to said parcel to sense presence of the parcel, in conjunction with an electronic sensor configured to electronically obtain the metadata in response to the optical sensor sensing physical presence of said parcel; and
   a radio-frequency identification (RFID) reader configured to sense presence of the parcel simultaneously with electronically obtaining the metadata.

3. The destination validation device according to claim 1, wherein the obtained metadata is encrypted, and execution of the software instructions causes the destination validation device further to decrypt the obtained metadata and read therefrom a parcel identifier, a destination of the parcel, and an indication whether the signature is required.

4. The destination validation device according to claim 1, wherein the obtained metadata is decrypted using a cryptographic authentication of a destination of the parcel.

5. A parcel tracking system comprising:
   the destination validation device according to claim 1; and
   a delivery verification device, wherein the delivery verification device comprises:
      a transmitter,
      a receiver configured to receive the destination delivery acknowledgement from the destination validation device, and
      at least one data processor connected with at least one memory tangibly storing customer validation software, customer validation data and parcel tracking data, where execution of the customer validation software by the at least one data processor causes the delivery verification device to:
         for the case the destination delivery acknowledgement received from the destination validation device indicates that the signature is not required, immediately update the parcel tracking data to indicate the parcel has been delivered; else
         for the case the destination delivery acknowledgement received from the destination validation device indicates that the signature is required, update the parcel tracking data to indicate the parcel has been delivered only after receiving the personal delivery acknowledgement from a device or application that is associated in the customer validation data with an individual or an entity and also with a destination of the parcel wherein the personal delivery acknowledgement fulfills the signature requirement via a digital signature comprising a private key of the recipient, the private key of the recipient being in physical possession of the recipient and configured to generate the digital signature.

6. The parcel tracking system according to claim 5, wherein:
- an electronic address is associated with the individual or entity in the memory of the destination validation device or the delivery verification device; and
- the transmitter of the respective destination validation device or delivery verification device is configured, only for the case the destination delivery acknowledgement indicates that the signature is required, to send a request for the personal delivery acknowledgement to the electronic address associated with the individual or entity.

7. The parcel tracking system according to claim 6, where the destination validation device further comprises a receiver;
- the receiver of the respective destination validation device or delivery verification device is configured to receive the requested personal delivery acknowledgement which is encrypted and comprises a timestamp.

8. A method comprising:
- optically or electronically sensing by a device installed at a destination of a recipient physical presence of a parcel and obtaining metadata from said parcel;
- using a network protocol to process the metadata by compiling and/or decompiling the metadata into at least one message;
- reading the obtained metadata and determining therefrom whether a signature of the recipient is required for delivery of the parcel;
- preparing a destination delivery acknowledgement comprising:
  - cryptographically signing a delivery acknowledgement by the recipient with an embedded private key of the device to attest the authenticity of the delivery, wherein the destination delivery acknowledgement comprises a unique ID of the parcel, and
  - indicating whether said signature is required; and
- transmitting the prepared destination delivery acknowledgement as the at least one message over the network interface, wherein:
  - in response to the signature not being required, the cryptographically signing of the prepared destination delivery acknowledgement indicates delivery is complete, and
  - in response to the signature being required, the prepared destination delivery acknowledgement indicates delivery is contingent on receipt of a personal delivery acknowledgement from the recipient in reply to the destination delivery acknowledgement, wherein the personal delivery acknowledgement fulfills the signature requirement via a digital signature comprising a private key of the recipient the private key of the recipient being in physical possession of the recipient and configured to generate the digital signature;
  - wherein the optical or electronic sensing comprises blindly sending electronic queries, sensing presence of the parcel by receiving a response to one or more of said queries, and obtaining the metadata via a reply to a follow-up query requesting the metadata which the sensor sends after receiving the response.

9. The method according to claim 8, wherein the obtained metadata is encrypted and reading the obtained metadata comprises:
- decrypting the obtained metadata and reading therefrom a parcel identifier, a destination of the parcel, and an indication whether the signature is required.

10. The method according to claim 8, wherein the obtained metadata is decrypted using a cryptographic authentication of a destination of the parcel.

11. The method according to claim 8 pertained by a destination validation device, the method further comprising:
- performing by a delivery verification device:
- receiving the destination delivery acknowledgement from the destination validation device, and
- for the case the destination delivery acknowledgement received from the destination validation device indicates that the signature is not required, immediately updating a status of the parcel to indicate the parcel has been delivered; else
- for the case the destination delivery acknowledgement received from the destination validation device indicates that the signature is required, updating a status of the parcel to indicate the parcel has been delivered only after receiving the personal delivery acknowledgement from a device or application that is associated with an individual or an entity and also with a destination of the parcel.

12. The method according to claim 11, wherein an electronic address is associated with the individual or entity in a memory of the destination validation device or the delivery verification device; the method further comprising:
- only for the case the destination delivery acknowledgement indicates that the signature is required, sending a request for the personal delivery acknowledgement to the electronic address associated with the individual or entity.

13. The method according to claim 12, the method further comprising:
- receiving the requested personal delivery acknowledgement, decrypting the received personal delivery acknowledgement and reading therefrom a timestamp.

14. The method according to claim 13, wherein the receiving is performed by the destination validation device or the delivery verification device.

15. A computer program product comprised of software instructions on a computer-readable memory, where execution of the software instructions using a computer results in performing operations comprising:
- optically or electronically sensing by a device installed at a destination of a recipient physical presence of a parcel and obtaining metadata from said parcel;
- using a network protocol to process the metadata by compiling and/or decompiling the metadata into at least one message;
- reading the obtained metadata and determining therefrom whether a signature of the recipient is required for delivery of the parcel;
- preparing a destination delivery acknowledgement comprising:
  - cryptographically signing a delivery acknowledgement by the recipient with an embedded private key of the device to attest the authenticity of the delivery, wherein the destination delivery acknowledgement comprises a unique ID of the parcel, and
  - indicating whether said signature is required; and
- transmitting the prepared destination delivery acknowledgement as the at least one message over the network interface, wherein:
  - in response to the signature not being required, the cryptographically signing of the prepared destination delivery acknowledgement indicates delivery is complete, and in response to the signature being required, the prepared destination delivery acknowledgement indicates delivery is contingent on receipt of a personal delivery acknowledgement from the recipient in reply to the destination delivery acknowledgement, wherein the personal delivery acknowledgement fulfills the signature requirement via a digital signature comprising a private key of the recipient the private key of the recipient being in physical possession of the recipient and configured to generate the digital signature;

wherein the optical or electronic sensing comprises blindly sending electronic queries, sensing presence of the parcel by receiving a response to one or more of said queries, and obtaining the metadata via a reply to a follow-up query requesting the metadata which the sensor sends after receiving the response.

16. The computer program product according to claim 15, wherein the obtained metadata is encrypted and reading the obtained metadata comprises:

decrypting the obtained metadata and reading therefrom a parcel identifier, a destination of the parcel, and an indication whether the signature is required.

17. The computer program product according to claim 15, wherein the obtained metadata is decrypted using a cryptographic authentication of a destination of the parcel.

18. The computer program product according to claim 15 wherein execution of the software instructions by a destination validation device results in performing the operations according to claim 15, the computer program product comprising further software instructions which when executed by a computer of a delivery verification device results in the delivery verification device performing operations comprising:

receiving the destination delivery acknowledgement from the destination validation device, and for the case the destination delivery acknowledgement received from the destination validation device indicates that the signature is not required, immediately updating a status of the parcel to indicate the parcel has been delivered; else for the case the destination delivery acknowledgement received from the destination validation device indicates that the signature is required, updating a status of the parcel to indicate the parcel has been delivered only after receiving the personal delivery acknowledgement from a device or application that is associated with an individual or an entity and also with a destination of the parcel.

19. The computer program product according to claim 18, wherein an electronic address is associated with the individual or entity in a memory of the destination validation device or the delivery verification device; the operations of the respective destination validation device or the delivery verification device further comprising:

only for the case the destination delivery acknowledgement indicates that the signature is required, sending a request for the personal delivery acknowledgement to the electronic address associated with the individual or entity.

20. The computer program product according to claim 19, the operations of the respective destination validation device or the delivery verification device further comprising:

receiving the requested personal delivery acknowledgement, decrypting the received personal delivery acknowledgement and reading therefrom a timestamp.

* * * * *